United States Patent [19]

Tootle et al.

[11] Patent Number: 4,714,006

[45] Date of Patent: Dec. 22, 1987

[54] FLUID ACTUATOR WITH FEEDBACK MECHANISM

[75] Inventors: James N. Tootle, Kalamazoo; Eugene J. Martin, Portage, both of Mich.

[73] Assignee: Pneumo Corporation, Boston, Mass.

[21] Appl. No.: 403,012

[22] Filed: Jul. 29, 1982

Related U.S. Application Data

[63] Continuation-in-part of Ser. No. 352,046, Feb. 24, 1982, Pat. No. 4,463,057.

[51] Int. Cl.⁴ .............................................. F01B 25/26
[52] U.S. Cl. ........................................ 92/5 R; 92/140; 74/105; 74/526
[58] Field of Search .................. 92/5 R, 5 L, 17, 31, 92/33, 140; 91/1; 74/102, 103, 104, 105, 526

[56] References Cited

U.S. PATENT DOCUMENTS

| | | | |
|---|---|---|---|
| 2,527,814 | 10/1950 | Hanssen | 92/5 R |
| 2,803,222 | 8/1957 | Bukoff | 92/5 L |
| 2,819,589 | 1/1958 | Geyer | 92/17 |
| 2,967,725 | 1/1961 | Roberson | 74/105 |
| 3,003,473 | 10/1961 | Ottoson | 92/5 R |
| 3,403,365 | 9/1968 | Richards | 92/5 R |
| 3,507,117 | 4/1970 | Lauck | 91/1 |
| 3,786,728 | 1/1974 | Sheesley et al. | 92/33 |
| 3,834,283 | 9/1974 | Beichel et al. | 92/33 |
| 4,023,623 | 5/1977 | Anderson | 74/105 |

*Primary Examiner*—Donald P. Walsh
*Assistant Examiner*—Richard L. Klein
*Attorney, Agent, or Firm*—Renner, Otto, Boisselle & Lyon

[57] ABSTRACT

A fluid actuator characterized by a feedback mechanism for indicating actuator position. The feedback mechanism is driven by the actuator screw shaft, whereby the movements of the feedback mechanism are proportional to the rate and position of the actuator movements. The feedback mechanism and actuator movements may be synchronized so that the extreme end positions of the feedback mechanism will correspond to the fully retracted and extended positions of the actuator. A stroke limiting mechanism may also be provided for preventing the actuator from overstroking the feedback mechanism in the event that they are not properly synchronized.

19 Claims, 10 Drawing Figures

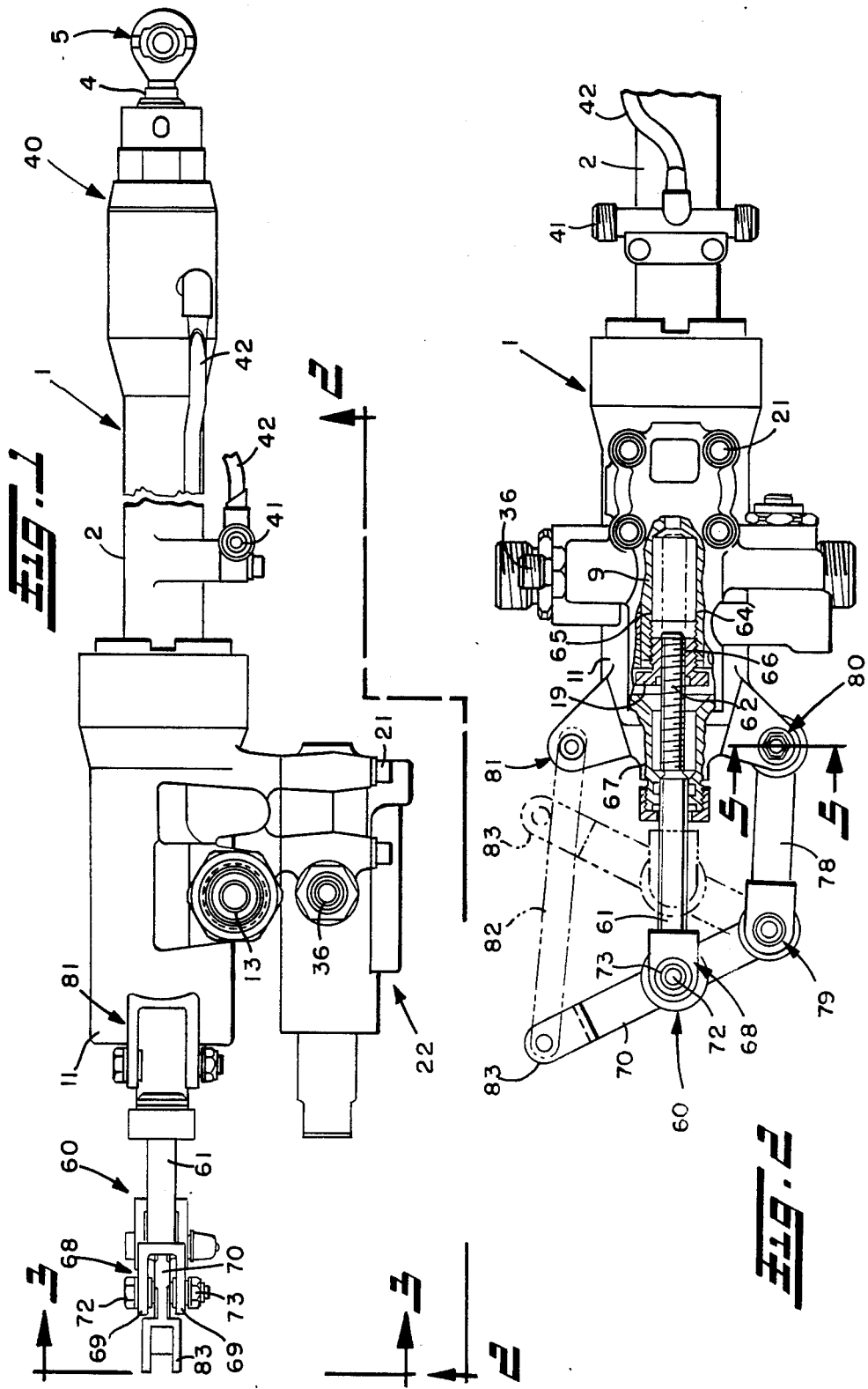

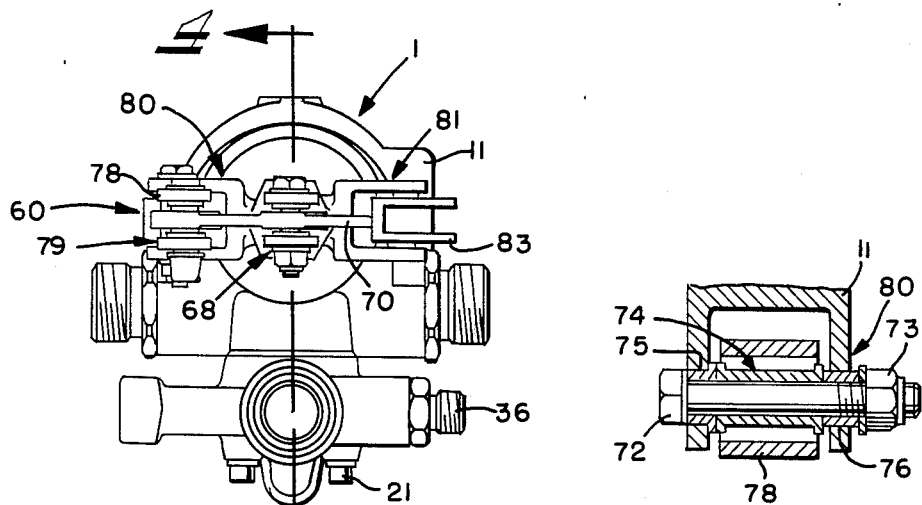
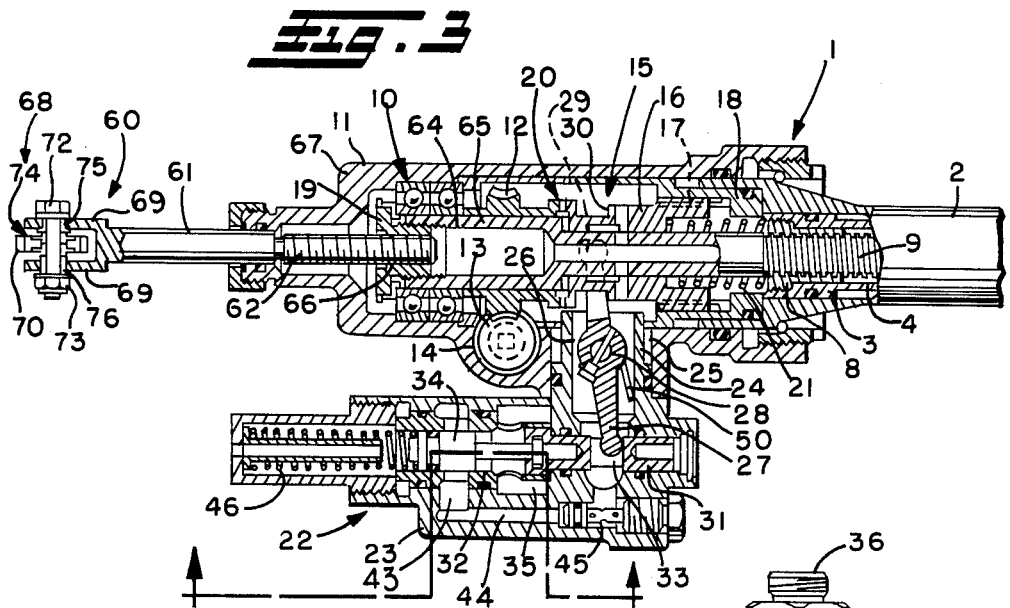
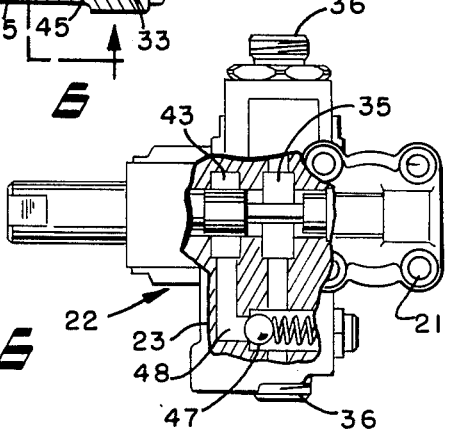

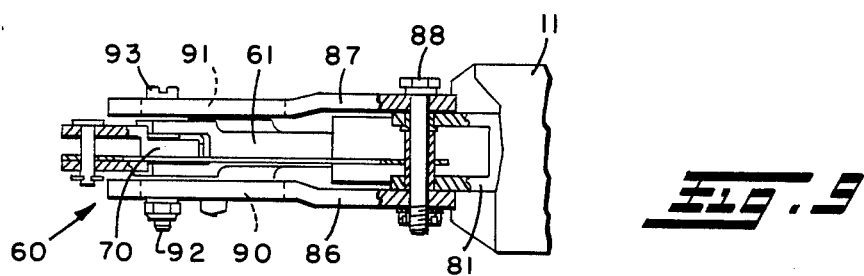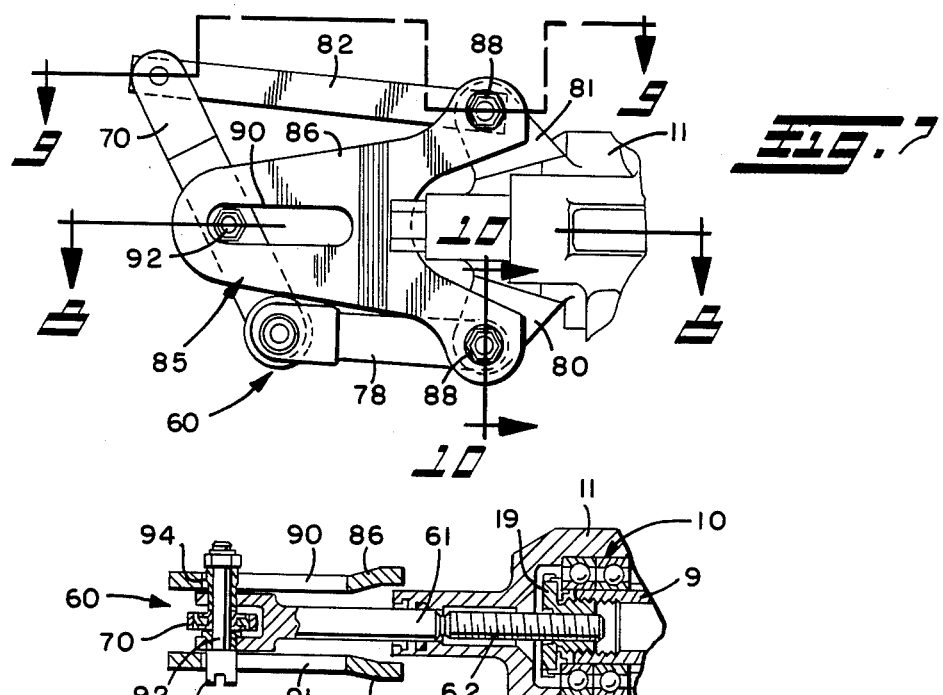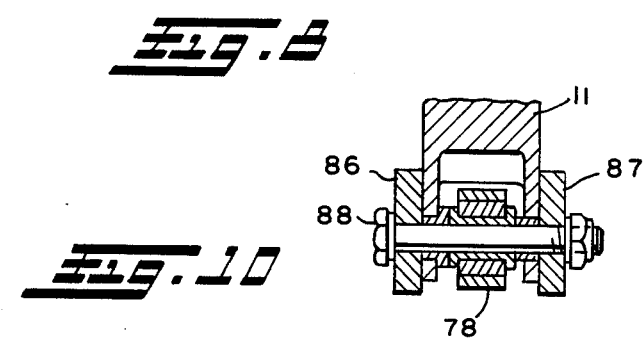

4,714,006

FLUID ACTUATOR WITH FEEDBACK MECHANISM

CROSS REFERENCE TO RELATED APPLICATIONS

This application is a continuation-in-part of U.S. application Ser. No. 352,046, filed Feb. 24, 1982, the disclosure of which is incorporated herein by reference.

DISCLOSURE

This invention relates generally as indicated to a fluid actuator with feedback mechanism for indicating the position of the actuator and particularly whether the actuator is in the fully extended or retracted position.

BACKGROUND OF THE INVENTION

In certain actuator installations it is important to be able to translate the actuator position to a remote location. For example, when the actuators are being used to actuate the thrust reversers for a jet engine on an aircraft, the pilot must know when the actuators are in the fully deployed or stowed position in that the engine throttle must be held at idle during either the deploy or stow cycle as the actuator is extending or retracting. Previously, feedback mechanisms have been provided for this purpose. However, typically such feedback mechanisms were driven by the motion of the thrust reverser members, and such feedback mechanisms added considerably to the size and weight of the overall system.

SUMMARY OF THE INVENTION

With the foregoing in mind, it is a principal object of this invention to provide a fluid actuator with a relatively compact and lightweight feedback mechanism for indicating actuator position.

Another object is to provide such a fluid actuator in which the feedback mechanism is driven by the actuator screw shaft.

Still another object is to provide such a fluid actuator in which the output stroke of the feedback mechanism is proportional to but substantially less than the actuator stroke.

Yet another object is to provide such a fluid actuator in which the output stroke of the feedback mechanism is synchronized with the output stroke of the actuator so that the extreme end positions of the feedback mechanism correspond to the fully retracted and extended positions of the actuator.

A further object is to provide such a fluid actuator in which overstroking of the feedback mechanism is prevented in the event that the feedback mechanism and actuator are not properly synchronized.

These and other objects of the present invention may be achieved by providing the fluid actuator with a feedback mechanism including a feedback screw that is driven by the actuator screw shaft, whereby the movements of the feedback mechanism are proportional to the rate and position of the actuator movements.

In accordance with the present invention, a linkage mechanism is attached to the feedback screw to restrain the feedback screw against rotation and provide an output which is laterally spaced from the axis of the feedback screw. The movements of the linkage mechanism at the output are proportional to but greater than the stroke of the feedback screw itself.

Also in accordance with the invention, the feedback screw may be disconnected from the linkage mechanism to permit the feedback screw to be rotated relative to the actuator screw shaft for synchronizing the feedback mechanism and actuator movements.

Further in accordance with the invention, a stroke limiting mechanism may be provided to prevent the actuator from overstroking the feedback mechanism in the event that they are not properly synchronized. The stroke limiting mechanism may include one or more stop brackets connected to one end of the actuator housing. Preferably two stop brackets are used which overlie opposite sides of the feedback mechanism and have aligned slots therein coinciding with the longitudinal axis of the feedback screw. An elongated stop bolt extends from the feedback screw through the aligned slots. By making the ends of the slots correspond to the extreme end positions of the feedback mechanism, the ends of the slots will act as a mechanical stop for both the feedback mechanism and actuator screw shaft connected thereto thus preventing the feedback mechanism from being overstroked by the actuator regardless of whether the actuator and feedback mechanism are in synchronism with each other.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a fragmentary side elevation view of a preferred form of fluid actuator with feedback mechanism in accordance with the present invention;

FIG. 2 is a fragmentary bottom plan view of the actuator of FIG. 1 as seen from the plane of the line 2—2 thereof, with portions of the actuator broken away to show how the feedback mechanism is connected thereto;

FIG. 3 is an end elevation view of the fluid actuator of FIG. 1 as seen from the plane of the line 3—3 thereof;

FIG. 4 is a fragmentary longitudinal section through the fluid actuator and feedback mechanism of FIG. 3, taken along the plane of the line 4—4 thereof;

FIG. 5 is an enlarged transverse section through the bearing mount between one of the feedback mechanism levers and actuator housing, taken on the plane of the line 5—5 of FIG. 2;

FIG. 6 is a fragmentary longitudinal section through the sequence-power valve mechanism associated with the fluid actuator, taken along the plane of the line 6—6 of FIG. 4;

FIG. 7 is a fragmentary bottom plan view of a modified form of actuator and feedback mechanism which may be substantially identical to the actuator and feedback mechanism of the FIGS. 1–5 embodiment but which additionally includes a stroke limiting mechanism for preventing the actuator from overstroking the feedback mechanism in the event that they are not properly synchronized;

FIG. 8 is a fragmentary longitudinal section through the feedback mechanism and actuator of FIG. 7, taken along the plane of the line 8—8 thereof;

FIG. 9 is a fragmentary sectional view through the output end of the feedback mechanism and one of the bearing mounts for the stroke limiting mechanism, taken along the plane of the line 9—9 of FIG. 7; and FIG. 10 is an enlarged transverse section through the bearing mount between one of the levers of the feedback mechanism and actuator housing.

DETAILED DESCRIPTION OF THE PREFERRED EMBODIMENTS

Referring now in detail to the drawings, and initially to FIGS. 1–6 thereof, one form of fluid actuator 1 in accordance with this invention is designated generally by the reference numeral 1. As clearly shown in FIG. 4, such fluid actuator includes a cylinder 2 containing a piston 3 axially movable therewithin. Attached to the piston is a hollow rod 4 which extends through the rod end of the cylinder and has a rod end assembly 5 on its outboard end (see FIG. 1) to facilitate connection to the movable part of the device to be actuated, such as the thrust reversers for a jet engine on an aircraft. A suitable trunnion mount may also be provided on the cylinder to facilitate connection to the other part of the device to be actuated.

The piston has a high lead Acme nut 8 in the center thereof which is coupled to a mating Acme screw shaft 9. One end of the screw shaft may be journaled in suitable bearings 10 within an actuator housing 11 attached to the head end of the cylinder, whereas the other end of the screw shaft extends into the hollow piston rod a substantial distance beyond the nut. As the piston moves back and forth in the cylinder, the screw shaft rotates at a speed proportional to the velocity of the piston.

The bearings 10 may be held in place on the screw shaft 9 by a bearing retainer 19 adjacent the outer end of the screw shaft. Attached to the screw shaft is a high lead worm wheel 12 which mates with a worm shaft 13 mounted for rotation within a transverse bore 14 in the actuator housing. Since the speed of the worm shaft is also proportional to the velocity of the piston rod, when the worm shafts of two or more actuators are connected together by a synchronous drive shaft or the like, they will be mechanically synchronized in both position and motion, as well known in the art.

When the actuator piston is in the retracted or stowed position shown in FIG. 4, such actuator may be locked in such position by a suitable lock mechanism 15, which may be of the type disclosed in the aforementioned copending application Ser. No. 352,046. As shown, such lock mechanism includes a movable lock sleeve 16 axially movable toward and away from the adjacent end of the worm gear 12. A splined connection 17 is provided between the movable lock sleeve and a piston stop 18 within the actuator housing to prevent rotation of the lock sleeve within the actuator housing while permitting limited axial movement therewithin.

The adjacent end faces of the worm gear and movable lock sleeve have cooperating lock teeth 20 thereon with ramp angles which when engaged permit ratcheting of the worm gear relative to the movable lock sleeve during retraction of the piston but not during extension thereof. Accordingly, the piston will continue to retract until it engages the retract stop 18. However, if at any time an attempt is made to reverse the piston direction while such lock teeth are in contact with each other, the lock teeth will instantly engage thus locking the screw shaft against rotation and preventing the piston from extending.

When the piston is fully retracted, the movable lock sleeve 16 is normally maintained in engagement with the worm gear 12 by a lock spring 21 interposed between the movable lock sleeve and piston head 3. During retraction of the actuator, as the piston approaches the end of its stroke, the piston head compresses the lock spring, causing the teeth on the movable lock sleeve to move into engagement with the teeth on the worm gear.

Before the actuator can be extended, the lock sleeve 16 must be moved away from the worm gear 12 to disengage the lock teeth 20, and then system pressure must be applied to the extend side of the actuator. Preferably, both such functions are accomplished by actuation of a sequence-power valve 22 which may be contained in a separate housing 23 having a generally right angle extension 24 at one end adapted to be received in a valve port 25 in one side of the actuator housing and releasably retained in place as by bolts 21 or the like. The extension contains a transverse bore 26 in which a toggle type lock release lever 27 is mounted on a shaft 28 for limited pivotal movement. The inner end of the lock release lever extends into the actuator housing and has a fork 29 thereon surrounding the movable lock sleeve. When the lever 27 is pivoted about the shaft 28 in a generally clockwise direction as viewed in FIG. 4, the fork 29 will engage a shoulder 30 on the movable lock sleeve 16 thus forcing the movable lock sleeve out of engagement with the worm gear 12.

For effecting such pivotal movement of the lock release lever, a movable lock plunger 31 is provided in a longitudinal bore 32 in the sequence-power valve housing extending in a direction generally parallel to the longitudinal axis of the actuator cylinder. The lock plunger 31 has a longitudinal slot 33 therein which receives the outer end of the lock release lever 27. Attached to the lock plunger 31 is a lock piston 34 having a differential area which is acted upon by fluid pressure admitted to a lock-in annulus 35 within the bore through an exterior port 36 (see FIGS. 1–3 and 6) to cause the lock piston to move to the left as viewed in FIG. 4, dragging the lock plunger with it. This causes the lock release lever 27 to pivot about the shaft 28 and move the lock sleeve 16 axially inwardly against the force of the lock spring 21 to disengage the lock sleeve from the worm gear 12.

Before system pressure is admitted to the lock-in annulus 35 to release the lock, such system pressure is first desirably applied to the retract end 40 of the actuator through a retract port 41 and porting tube 42 (see FIG. 1) to remove any axial tension loads on the actuator which might otherwise interfere with release of the lock. Then, with system pressure still applied to the retract port, system pressure is also applied to the lock-in annulus 35 to release the lock in the manner previously described.

After the lock piston 34 has moved far enough to release the lock, the system pressure acting on the lock piston is ported to the extend end of the actuator through another annulus 43 in the lock piston bore 32 which is uncovered by the lock piston following such movement. Such annulus 43 communicates with actuator port 25 through an extend passage 44 in the sequence-power valve housing. Since the area of the actuator piston 3 exposed to the extend pressure is greater than that exposed to the retract pressure, the actuator will extend. An extend orifice 45 in the extend passage 44 prevents the external pressure at the lock-in port 35 from dropping below a predetermined level so that the lock piston 34 will not cycle during extension of the actuator.

To retract the actuator, the pressure acting on the extend end of the actuator is reduced, as by connecting the lock-in port 35 to return pressure, while still maintaining system pressure on the retract end of the actuator. With reduced pressure at the lock-in port, a return spring 46 acting on the lock piston 34 will cause the lock piston to return to its original position blocking fluid flow from the extend end of the actuator through the lock piston bore 32. However, as can be seen in FIG. 6, return flow from the extend end of the actuator still occurs through a check valve 47 in another passage 48 in the housing 23 providing communication between the extend end of the actuator and the lock-in port.

As the actuator retracts, the lock teeth 20 are prevented from prematurely engaging by a torsion spring 50 acting on the lock release lever 27 to maintain the lock release lever in the unlocking position until the actuator piston 3 engages the lock spring 21 and compresses same sufficiently to overcome the relatively light force of the torsion spring and force the lock teeth into engagement. This normally occurs within the last 3/10 inch or so of the retract stroke. However, the actuator will continue to move in the stow direction until the actuator piston engages the internal stop 18 because of the torque developed by the screw shaft 9 and the ramp angles of the lock teeth 20 which cause the lock teeth to ratchet over each other. When the actuator piston engages the retract stop, the screw shaft also stops, and since the lock teeth are already in engagement with each other, any motion that tends to extend the actuator will cause the locking faces of the lock teeth to engage thus providing a positive lock against such motion.

Additional actuators of the same or similar construction with or without the lock mechanism and associated sequence-power valve may be mechanically synchronized both in position and motion with the locking actuator 1 by connecting the worm shafts of the actuators together by flex shafts or the like. The extend pressure acting on the extend end of the locking actuator 1 may also be transmitted to the extend ends of the other actuators through sealed tubes surrounding the flex shafts, whereby extend pressure will be simultaneously applied to the extend ends of all of the actuators, but not before the lock mechanism of the locking actuator 1 has been released. The retract ends of all of the actuators may similarly be interconnected by hydraulic conduits to ensure that the same hydraulic pressure is also simultaneously applied thereto.

When the pilot desires to deploy the locking actuator 1, the first connects the pressure side of the aircraft hydraulic system to the retract port 41 to supply pressure to the retract end of the actuator to make certain that the actuator piston 3 is seated firmly on the stow stop 18 within the actuator cylinder, which unloads the lock mechanism. The actuator will remain in the stowed position until the pilot supplies system pressure to the lock-in port 35 of the sequence-power valve 22, first to unlock the locking actuator, and then to pressurize the extend end of the actuator in the manner previously described. Although there will then be system pressure on both sides of the actuator piston, the actuator will extend because of the unbalanced area of the piston as aforesaid.

During either the deploy or stow cycle, as the actuator is extending or retracting, the engine throttle must be held at idle. Accordingly, it is important to be able to communicate to the pilot when the actuator reaches the fully deployed or stowed position.

In the preferred form of actuator construction disclosed herein, such actuator position is made known as by providing a feedback mechanism 60 operatively connected to the actuator screw shaft 9. Such feedback mechanism comprises a feedback screw 61 which as can be seen in FIGS. 2 and 4 has a threaded inner end 62 extending into a central recess 64 in the enlarged outer end portion 65 of the actuator screw shaft. The bearing retainer 19 may be threadedly connected to the screw shaft for rotation therewith, and has an internal threaded central bore 66 for threaded engagement by the threaded inner end 62 of the feedback screw 61. Accordingly, rotation of the actuator screw shaft will cause the feedback screw to move at a rate and position proportional to the piston rod 4.

The feedback screw 61 extends through a sealed opening in the actuator housing end wall 67 and outwardly therebeyond a sufficient distance to permit limited axial movement of the feedback screw in opposite directions during extension and retraction of the actuator in a manner to be subsequently described. At the outer end of the feedback screw is a clevis or yoke 68 having a pair of arms 69 between which is journaled a feedback lever 70 intermediate the ends thereof. As best seen in FIGS. 1 and 4, the feedback lever is connected to the feedback screw by a bolt 72 and nut 73 and is restrained against lateral movement relative to the feedback screw by an elongated kinematic sleeve bearing 74 extending between the clevis arms 69 and a pair of bushings 75, 76 received in the openings in the clevis arms through which the bolt extends. The bushings 75, 76 are pressed against the opposte ends of the bearings 74 upon tightening the nut 73 to provide anti-rotation of the feedback screw 61 laterally relative to the feedback lever 70.

The feedback lever 70 is restrained against lateral movement by a drag lever 78 extending between the actuator housing and one end of the feedback lever. As best seen in FIGS. 2 and 3, the outer end of the drag lever 78 has a clevis 79 thereon for journaling of one end of the feedback lever thereto, much in the same manner as the journal connection between the feedback lever and feedback screw, to provide an anti-rotation connection therebetween in a lateral direction.

The inner end of the drag level 78 is connected to a clevis 80 on one side of the actuator housing 11, but as seen in FIGS. 1 and 5, the journal mount between the drag lever and clevis 80 is otherwise substantially the same as the journal mount between the feedback lever and feedback screw. Accordingly, the same reference numerals are used to designate like parts. Also, another clevis 81 may be provided on the opposite side of the actuator housing to permit a shipping link 82, shown in phantom lines in FIG. 2, to be used to connect the output end 83 of the feedback lever 70 to the actuator housing 11 during shipment.

A suitable linkage mechanism, not shown, may be connected to the output end of the feedback lever to provide the feedback signal to the pilot indicating the position of the actuator. When the output end 83 is in its outermost position shown in solid lines in FIG. 2, it signals that the actuator is in the fully stowed and locked position, whereas when such output end is in its innermost position shown in phantom lines in FIG. 2, it signals that the actuator is in the fully extended or deployed position.

As the actuator piston 3 moves back and forth in the cylinder 2, the actuator screw shaft 9 rotates at a speed proportional to the velocity of the piston. Accordingly, by proper selection of the number of threads on the feedback screw 61, the axial movement of the feedback screw may be substantially less than the piston stroke. Likewise, by proper selection of the length of the feedback lever 70 and drag lever 78 and location of the journal mount between the feedback lever and feedback screw, the feedback stroke at the output end 83 of the feedback lever may be made proportionally greater than the stroke of the feedback screw itself. As an example, a 1½ inch feedback screw movement may be equivalent to 21¾ inches of piston stroke and may provide 3¾ inches of feedback stroke at the output end 83 of the feedback lever.

To synchronize the feedback mechanism and actuator movements so that the extreme end positions of the output end of the feedback lever 70 will correspond to the fully retracted and extended positions of the actuator piston 3, before the rod end assembly is connected to the device to be actuated, the piston rod 4 may be manually rotated after release of the lock mechanism 15 to cause the piston and actuator screw shaft 9 to rotate as a unit, thus causing axial movement of the feedback screw 61. When the piston is fully retracted, the piston rod and actuator screw shaft may be rotated until a gauge bar, not shown, will just fit between a predetermined point on the feedback lever and a point on the housing. This will place the output end of the feedback mechanism at its extreme retracted position corresponding to the fully retracted position of the actuator.

Alternatively the feedback screw 61 may be disconnected from the feedback lever so that the actuator can be fully retracted without overstroking the feedback mechanism. Then the feedback screw may be rotated relative to the actuator until its length is such that when it is reconnected to the feedback lever, a gauge bar, not shown, will just fit between a predetermined point on the feedback lever and a point on the housing.

To prevent the actuator from overstroking the feedback mechanism 60 in the event that they are not properly synchronized, a stroke limiting mechanism 85 such as shown in FIGS. 7-10 may be provided on the outer end of the actuator housing 11. Such stroke limiting mechanism desirably consists of a pair of stop brackets 86, 87 disposed on opposite sides of the feedback mechanism. One end of each stop bracket may be connected to the same clevis 80, 81 on opposite sides of the actuator housing to which the drag lever 78 and shipping lever 82 are connected by using longer bolts 88 than the bolts 72 of the FIGS. 1-5 embodiment. The brackets have aligned slots 90,91 therein coinciding with the longitudinal axis of the feedback screw 61. Extending between the slots in an elongated stop bolt 92 which is also used to connect the feedback screw 61 to the feedback lever 70.

As can be seen in FIGS. 8 and 9, the head 93 of the bolt 92 will engage the ends of the slot 91 in one of the stop brackets 87 at the extreme end positions of the feedback mechanism, whereas the other end of the bolt desirably has a stop bushing 94 thereon for engaging the ends of the slot 90 in the other bracket 86 at such extreme end positions. Also, as seen in FIG. 8, the stop bushing 94 may be an extension of the bushing 76 shown in FIG. 4. Otherwise, the construction of the feedback mechanism shown in FIGS. 7-10 is substantially identical to the feedback mechanism previously described, and the same reference numerals are used to designate like parts.

Preferably the length of the slots 90, 91 in the stop brackets 86, 87 correspond to a slight overstroke condition of the feedback mechanism, for example, approximately 1/16" extra stroke on each end of the actuator stroke so that during normal operation the actuator will stop on the actuator stops at the ends of its stroke and not on the feedback stops provided at the ends of the slots 90, 91. However, the feedback stops will provide a mechanical stop for both the feedback mechanism and actuator screw shaft 9 connected thereto when the actuator and feedback mechanism are not properly synchronized thus preventing the feedback mechanism from being overstroked by the actuator beyond such slight overstroke condition so as to protect the feedback mechanism against damage due to overstroking.

From the foregoing, it will now be apparent that the fluid actuator of the present invention includes a relatively compact and light-weight feedback mechanism that is driven by the actuator screw shaft for accurately indicating the position of the actuator and particulary whether the actuator is fully extended or retracted. Provision is also made for synchronizing the feedback mechanism and actuator movements so that the extreme end positions of the feedback mechanism may be made to correspond to the fully retracted and extended positions of the actuator. Also, a stroke limiting mechanism may be provided for preventing the actuator from overstroking the feedback mechanism in the event that they are not properly synchronized.

Although the invention has been shown and described with respect to certain preferred embodiment, it is obvious that equivalent alterations and modifications will occur to others skilled in the art upon the reading and understanding of the specification. The present invention includes all such equivalent alterations and modifications and is limited only by the scope of the claims.

The embodiments of the invention in which an exclusive property or privilege is claimed are defined as follows:

1. A fluid actuator comprising a cylinder, a piston axially movable within said cylinder, a rotatable member operatively connected to said piston such that axial movement of said piston causes rotation of said rotatable member, and linear feedback means driven by said rotatable member for indicating the position of said actuator, said feedback means including an output member whose movements are proportional to the rate of movement and position of said piston, said feedback means including a feedback screw having a threaded connection with said rotatable member, and means for restraining said feedback screw against rotation, whereby rotation of said rotatable member will cause axial movement of said feedback screw, said means for restraining said feedback screw against rotation comprising a linkage mechanism, said linkage mechanism comprising a first lever to which said feedback screw is connected to prevent rotational movement of said feedback screw laterally relative to said first lever, and a second lever connecting said first lever to said actuator preventing lateral movement of said levers relative to said actuator.

2. A fluid actuator as set forth in claim 1 further comprising an actuator housing attached to one end of said cylinder, said actuator housing containing bearings for rotatably supporting said one end of said rotatable member therewithin, and said second member comprising a bearing retainer for said bearings.

3. A fluid actuator as set forth in claim 2 further comprising a second member attached to said rotatable member for rotation therewith, said second member having a threaded opening therethrough in which said feedback screw is threadedly received, said rotatable member having a recess in one end, said second member being secured to the outer end of said recess for rotation therewith, and said feedback screw extending through said second member into said recess.

4. A fluid actuator as set forth in claim 3 further comprising an actuator housing attached to one end of said cylinder, said feedback screw being connected to said first lever intermediate the ends thereof, and said second lever having its opposite ends respectively connected to one end of said first lever and to said actuator housing, the other end of said first lever providing the output for said feedback means.

5. A fluid actuator as set forth in claim 4 wherein said connections between said first lever and feedback screw and between said second lever and first lever and actuator housing include sleeve bearings and bushings providing for anti-rotation of said feedback screw relative to said levers.

6. A fluid actuator comprising a cylinder, a piston axially movable within said cylinder, a rotatable member operatively connected to said piston such that axial movement of said piston causes rotation of said rotatable member, and linear feedback means driven by said rotatable member for indicating the position of said actuator, said feedback means including an output member whose movements are proportional to the rate of movement and position of said piston, and stroke limiting means for preventing said actuator from overstroking said feedback means in the event that said feedback means and actuator movements are not synchronized, said stroke limiting means comprising stop means providing a mechanical stop at the extreme end positions of said feedback means, said feedback means including a feedback screw, and means for causing axial movement of said feedback screw in response to rotation of said rotatable member, and said stop means comprising a stop bracket having a slot therein, and a stop bolt on said feedback screw extending into said slot, the ends of said slot corresponding to the extreme end positions of said feedback screw.

7. A fluid actuator as set forth in claim 6 wherein one end of said stop bracket is connected to said actuator.

8. A fluid actuator as set forth in claim 6 wherein there are two stop brackets, said stop brackets being on opposite sides of said feedback screw, said stop brackets being connected at one end to said actuator and having aligned slots therein in axial alignment with said feedback screw, and a stop bolt extends through said feedback screw and has its opposite ends received in said aligned slots.

9. A fluid actuator as set forth in claim 8 wherein said stop bolt extends through the outer end of said feedback screw.

10. A fluid actuator as set forth in claim 9 further comprising a feedback lever, said feedback screw being connected to said feedback lever intermediate the ends of said feedback lever by said stop bolt.

11. A fluid actuator as set forth in claim 10 further comprising a drag lever having opposite ends respectively connected to said feedback lever spaced from said feedback screw and to said actuator.

12. A fluid actuator as set forth in claim 11 wherein said drag lever is connected to one end of said feedback lever, and the other end of said feedback lever comprises the output end of said feedback means.

13. A fluid actuator comprising a cylinder, a piston axially movable within said cylinder, an actuator screw shaft operatively connected to said piston for rotational movement during axial movement of said piston, and a feedback screw operatively connected to said actuator screw shaft for axial movement of said feedback screw in response to such rotational movement of said actuator screw shaft, such axial movements of said feedback screw being proportional to the rate of movement and position of said piston, said feedback screw having a threaded connection with one end of said actuator screw shaft, and means for restraining said feedback screw against rotation, whereby rotation of said actuator screw shaft in opposite directions causes axial inward and outward movement of said feedback screw relative to said actuator screw shaft, said means for restraining said feedback screw against rotation comprising a first lever to which said feedback screw is connected preventing rotational movement of said feedback screw laterally relative to said first lever, and a second lever connecting said first lever to said actuator preventing lateral movement of said levers relative to said actuator.

14. A fluid actuator as set forth in claim 13 wherein said feedback screw is connected to said first lever intermediate the ends thereof, and said second lever has its opposite ends respectively connected to one end of said first lever and to said actuator, the other end of said first lever providing the output for said feedback screw.

15. A fluid actuator as set forth in claim 14 further comprising stroke limiting means for preventing said actuator from overstroking said feedback screw in the event that said feedback screw and actuator movements are not synchronized.

16. A fluid actuator as set forth in claim 15 wherein said stroke limiting means comprises stop means providing a mechanical stop at the extreme end positions of said feedback screw.

17. A fluid actuator as set forth in claim 16 wherein said stop means comprises a stop bracket having a slot therein, and a stop bolt on said feedback screw extending into said slot, the ends of said slot corresponding to the extreme end positions of said feedback screw.

18. A fluid actuator as set forth in claim 17 wherein there are two stop brackets on opposite sides of said feedback screw, said stop brackets being connected at one end to said actuator, each of said stop brackets having aligned slots therein which receive opposite ends of a stop bolt extending through said feedback screw.

19. A fluid actuator as set forth in claim 18 further comprising a feedback lever, said feedback screw being connected to said feedback lever intermediate the ends thereof by said stop bolt, and a drag lever having opposite ends respectively connected to one end of said feedback lever and to said actuator, and the other end of said feedback lever comprising the output for said feedback screw.

* * * * *